US005937722A

United States Patent [19]

Albright

[11] Patent Number: 5,937,722

[45] Date of Patent: Aug. 17, 1999

[54] PAPER SLITTER OR PERFORATOR MAGNETIC AUTOMATIC NORMAL FORCE SYSTEM

[75] Inventor: Roger N. Albright, Fairport, N.Y.

[73] Assignee: Xerox Corporation, Stamford, Conn.

[21] Appl. No.: 08/927,586

[22] Filed: Sep. 11, 1997

[51] Int. Cl.[6] .................... B23D 19/04

[52] U.S. Cl. .................... 83/498; 83/499; 83/504; 83/508.2; 83/698.21

[58] Field of Search .................... 83/498, 499, 500, 83/504, 508.2, 698.21

[56] References Cited

U.S. PATENT DOCUMENTS

| | | | |
|---|---|---|---|
| 3,367,225 | 2/1968 | Stanford et al. . | |
| 3,939,745 | 2/1976 | Weeks et al. | 83/425.3 |
| 3,996,828 | 12/1976 | Granger et al. | 83/500 |
| 4,559,855 | 12/1985 | Schieck | 83/482 |
| 5,099,734 | 3/1992 | Sugiyama et al. | 83/498 |
| 5,158,525 | 10/1992 | Nikkel | 493/471 |
| 5,447,086 | 9/1995 | Wittmaier et al. | 83/666 |
| 5,458,034 | 10/1995 | Cavagna | 83/488 |
| 5,596,918 | 1/1997 | Longwell et al. | 83/332 |

*Primary Examiner*—Lee W. Young
*Assistant Examiner*—Kevin G. Vereene

[57] ABSTRACT

A system for shearing (slitting or perforating) sheets in a paper path, with a system for selectably changing the sheet shearing position anywhere transversely of the entire sheet width, with a first shearing member such as a rotatable disk moveable laterally of the paper path on one side of the paper path mating with a second shearing member, preferably a rotatable anularly grooved hub, mounted for movement laterally of the paper path on the opposite side of the paper path; wherein these first and second shearing members are maintained aligned and operatively mating through the paper path for sheet shearing with an automatic alignment and normal force system automatically coordinated with changing the lateral shearing position of the sheets, yet with no direct mechanical connection therebetween or through the paper path. Disclosed therefor is a magnetic field system acting laterally to put the second shearing member into constant force engagement with the first shearing member, which may at a side wall of the hub groove, irrespective of the lateral repositioning.

7 Claims, 2 Drawing Sheets

PAPER SLITTER OR PERFORATOR MAGNETIC AUTOMATIC NORMAL FORCE SYSTEM

Figure 1:
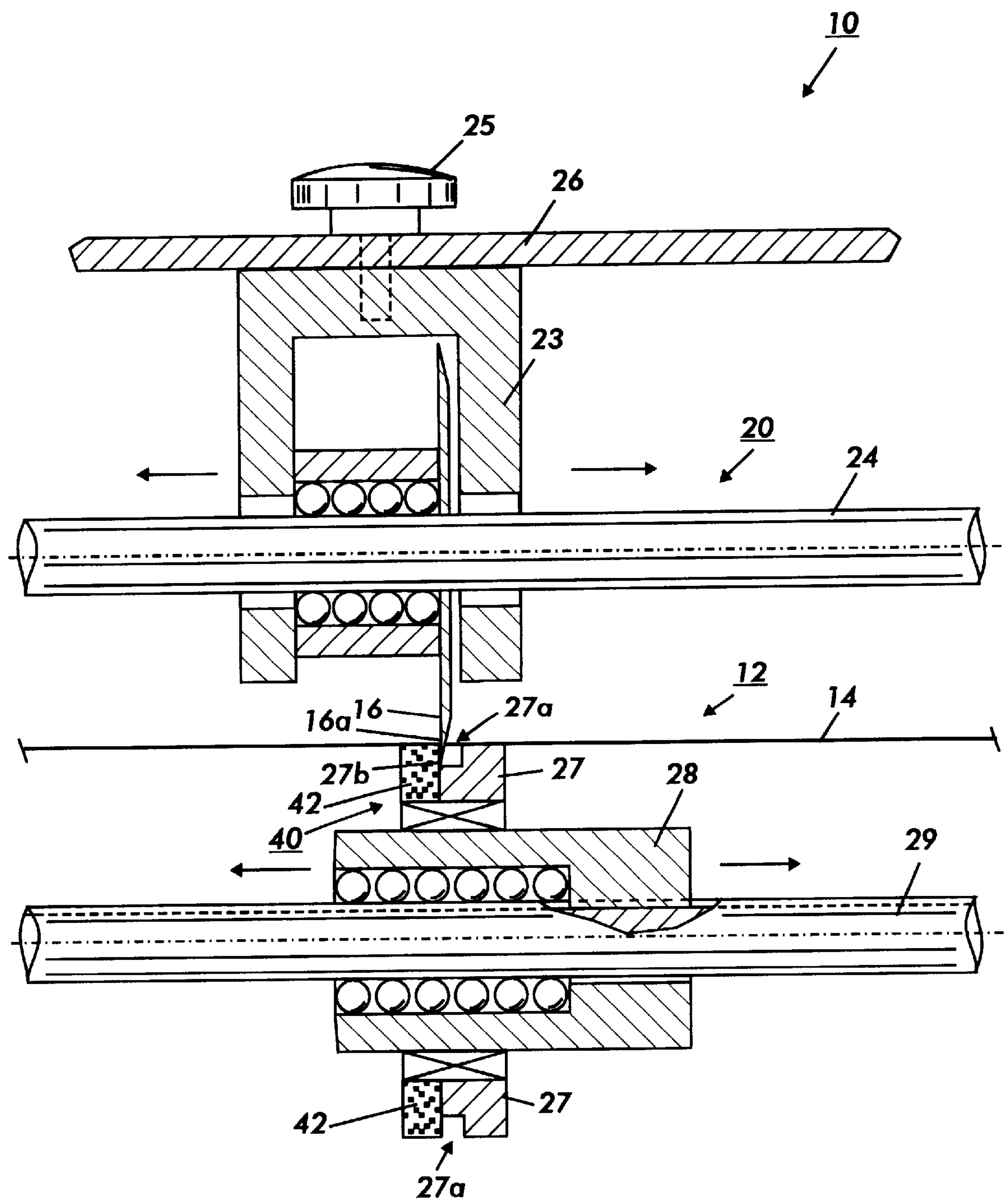

Cross-reference is made to a related co-pending application of the same inventor and assignee, Docket No. D/96070, application Ser. No. 08/927,585.

Disclosed in the embodiments herein is an improved variable slitting position sheet slitting or perforating system, with a simple, more reliable, automatic, constant normal force system. It may be used in a simple system providing an easily variable slitting or perforating position or positions of the sheets outputted by copiers, printers and other reproduction apparatus, on-line, i.e., as they are being printed.

In reproduction apparatus in general, including xerographic and other copiers and printers, or multifunction machines, it is increasingly important in general to provide more reliable, variable, and automatic handling of the physical image bearing substrate sheets, which can vary widely in size, weight, strength, and other characteristics. It is known to provide printed sheets with variable perforating, or burst lines, as they are also called. It is also known to slit or cut up standard size or larger printed sheets into plural sheets, especially, sheets with plural small images. It is also known that either or both can desirably be done on-line, i.e., as each sheet is printed and being outputted by the reproduction apparatus, in a connecting finishing module or directly internally of the reproduction apparatus. Of particular interest in this regard is Xerox Corp. U.S. Pat. No. 4,559,855 issued Dec. 24, 1985 to Richard A. Schieck, and other references cited therein. The present system may, if desired, be incorporated into that or other such plural mode, plural slitting positions, on-line units, and accordingly, further details thereof need not be described herein. As described in that patent, e.g., Col. 7, lines 47–63, inter alia, alignment and lateral end abutment of a cutting or shearing edge member on one mounting shaft and a mating shearing roller on another shaft on the opposite side of the paper path is needed, and is provided there to a limited extent by selectable plural shearing engagement surfaces and plural individual springs on the shaft axis.

However, it has been found that the variable normal force such springs provide between these mating shearing surfaces is undesirable, and that such normal force springs do not accommodate a system in which a slitter is laterally repositionable by a large lateral distance, such as laterally across the entire sheet path, to allow a sheet cutting or perforation position anywhere desired across the sheet width. Also, it is important to note that a direct vertical mechanical link or connection is not possible between the mating shearing surface members on opposite sides of the paper path, since that would block or obstruct the paper path.

The present system allows for a fully selectable range of any desired sheet positions for cutting or perforating. That is, unobstructed lateral repositioning of a slitter/perforator. Yet, the present system can automatically maintain both common movement and alignment and a constant normal force with the mating cooperative cutting assistance roller or other surface on the other side of the paper path, without any obstructive mechanical connection though the paper path.

A specific feature of the specific embodiments disclosed herein is to provide a sheet shearing system for shearing sheets in a generally planar portion of a paper path before said sheets are outputted by a reproduction system, which sheet shearing system includes a lateral adjustment system for selectably changing the shearing position of the sheets to be sheared, laterally of said paper path, and which sheet shearing system comprises a first sheet shearing member mounted for movement laterally of said paper path on a first side of said paper path and a second sheet shearing member mounted for movement laterally of said paper path on the second, opposite, side of said paper path, and wherein said first and second shearing members are aligned and operatively mating through said paper path for said sheet shearing; the improvement comprising an automatic alignment and normal force system for maintaining said operative alignment and operative mating of said first and second shearing members in coordination with said lateral adjustment system changing said the lateral shearing position of the sheets to be sheared, wherein said automatic alignment and normal force system includes a magnetic force system for maintaining a constant lateral shearing normal force between said first and second shearing members with no mechanical connection therebetween through said paper irrespective of the lateral position of said second shearing member.

Further specific features disclosed herein, individually or in combination, include those wherein said first shearing member is a sheet cutting member mounted on a linearly transversely moveable cutting unit transport, and said second shearing member is a rotatable hub member mounted on a linearly transversely moveable hub transport; and/or wherein said hub member has an annular groove which is wider than said sheet cutting blade member into which said cutting member extends through said paper path; and/or wherein said annular groove of said hub member has at least one vertical side wall shearing surface, and wherein said sheet cutting blade member laterally engages said vertical side wall shearing surface with said constant normal force from said constant force spring; and/or wherein said magnetic force system comprises a magnet providing a magnetic field attracting said sheet cutting blade member against said vertical side wall shearing surface; and/or wherein said magnetic force system comprises a ring magnet forming said vertical side wall shearing surface and providing a magnetic field attracting said sheet cutting blade member against said vertical side wall shearing surface; and/or wherein said magnetic force system comprises opposing magnets on said first and second shearing members providing a transverse directional force therebetween; and/or wherein said magnetic force system comprises opposing field magnets respectively mounted on said first and second shearing members on opposite sides of said paper path, magnetically acting through said paper path to providing a transverse directional force therebetween pushing said first and second shearing members into sheet shearing engagement; and/or wherein said magnetic force system comprises opposing field magnets respectively mounted on said first and second shearing members on opposite sides of said paper path, magnetically acting through said paper path to providing a transverse directional force therebetween pushing said sheet cutting blade member against said vertical side wall shearing surface.

In the description herein the terms "sheet" or "document" refers to usually flimsy physical sheets of paper, plastic, or other suitable physical substrate for printing images thereon, whether precut or initially web fed and then cut. A "copy sheet" may be abbreviated as a "copy", or called a "hardcopy". Sheet "shearing", as used in the claims here, will be understood to also encompass the partial or intermittent sheet shearing for perforation or burst lines provided by a serrated or intermittent edge on a sheet cutting or shearing disk or roller.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Figure 2:
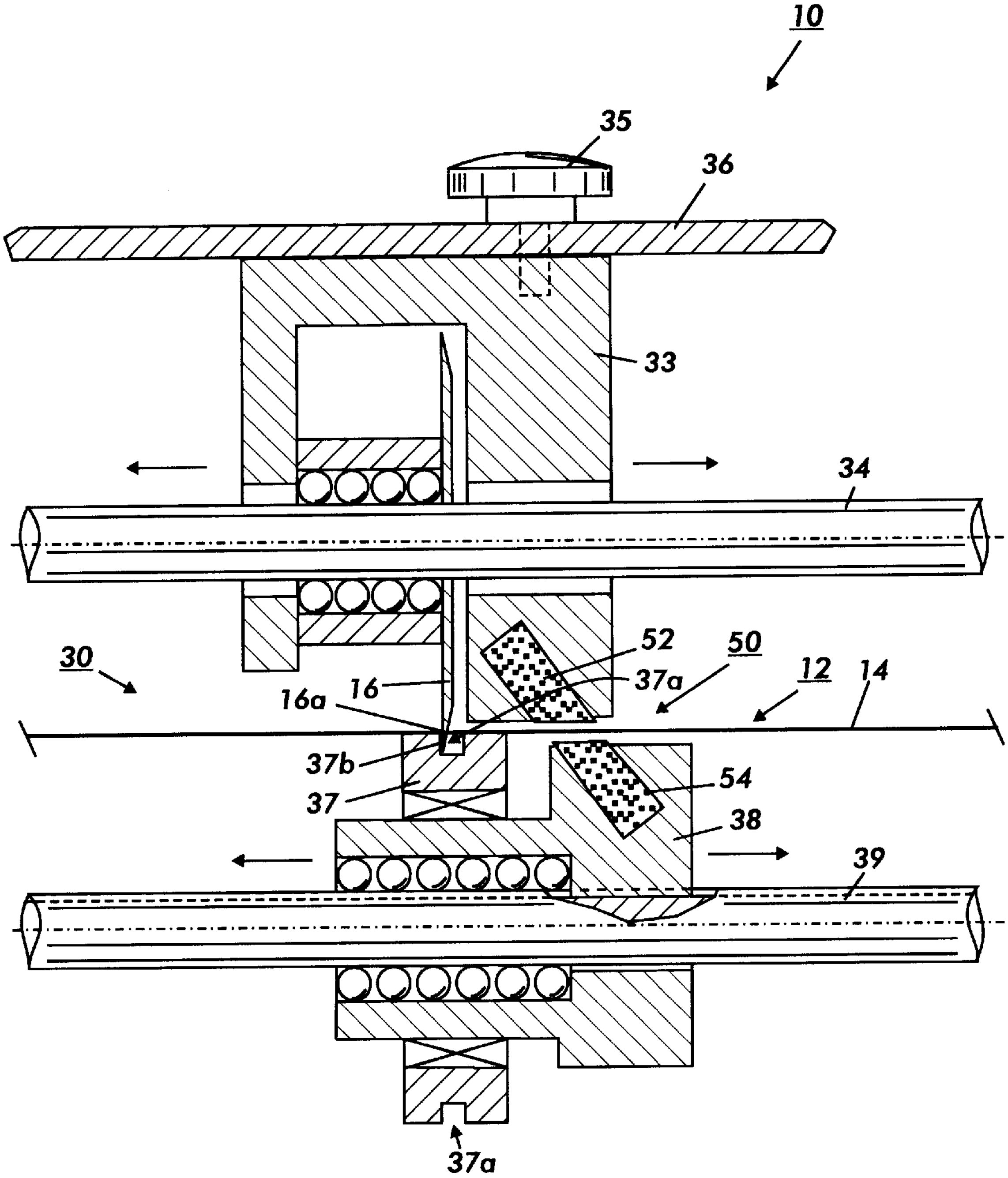

Various of the above-mentioned and further features and advantages will be apparent from the specific apparatus and its operation described in the examples below, and the claims. Thus, the present invention will be better understood from this description of specific embodiments, including the drawing figures (approximately to scale) wherein:

FIG. 1 is a cross-sectional end view of an exemplary reproduction machine output with an exemplary sheet slitting or perforating system containing one embodiment of the subject automatic alignment and normal force system; and FIG. 2 is essentially the same as FIG. 1 but with a second embodiment of the subject automatic alignment and normal force system.

Describing now in further detail these two exemplary embodiments with reference to the Figures, there is shown in both embodiments an output portion of a reproduction machine 10, with a sheet output path 12, with an exemplary sheet 14 being slit or perforated by a slitter/perforator system 20 of FIG. 1 or 30 of FIG. 2, with respective automatic alignment and normal force systems 40 and 50, to be described later below. Conventional upstream and/or downstream sheet feeding path defining nips and baffles are not shown here, for drawing clarity. In both exemplary systems here a conventional sharp edged slitter/perforator wheel 16 is rotatably mounted in a laterally repositionable slitter unit 23 or 33 to penetrate and cut the sheet 14 in the sheets output path 12 by slightly extending vertically through that sheet path. The slitter block or unit 23 or 33 is mounted for lateral repositioning on a horizontal mounting drive shaft 24 or 34, which shaft may be rotatably driven if the slitter wheel is driven (here it is on a rotatable bearing mount on this shaft). The slitter unit may be retained in the selected lateral position, as illustrated here by the adjusting externally exposed locknut 25 or 35 which may be tightened against a fixed sheet metal cover or frame slot edge 26 or 36.

In both systems 20 and 30, when the slitter block or unit 23 or 33 is so laterally repositioned, the slitter/perforator wheel 16 must remain in mating, paper shearing, engagement with, and in desired normal force with, its mating hub 27 or 37 on the opposite side of sheet path 12. Here that hub 27 or 37 is rotatably mounted on a hub block 28 or 38 which is freely horizontally movable along a horizontal hub shaft 29 or 39. Shaft keying, and a linear movement ball bearing, are illustrated here for the hub blocks 28 and 38.

Each hub 27 or 37 here has an annular outer recess or groove 27*a*, 37*a* into which the cutting edge of the slitter/perforator wheel 16 partially extends. Here, the vertical cutting side 16*a* of the slitter/perforator wheel 16 rides with a desired normal force against a mating, slightly overlapping, vertical shearing side wall 27*b*, 37*b* of that recess 27*a*, 37*a* during operation to provide the sheet shearing line.

However, the lateral repositioning movement of the hub block 28 or 38 along the hub shaft 29 or 39 must be done in coordination with a lateral repositioning of the slitter unit 23 or 33 to maintain their mating, sheet cutting, engagement. Yet, as noted above, since they are on opposite sides of the sheet path 12, that cannot be done by any direct mechanical connection which would extend through, and thus block, the sheet path.

During gross initial lateral repositioning of the slitter block or unit 23 or 33, either side of the slitter/perforator wheel 16 here can engage and move either side wall of the hub recess 27*a*, 37*a* into which it extends. However, much more accurate alignment, and a constant normal force, is needed to re-establish, in any new sheet cutting position, the above described mating of the desired cutting side 16a of the cutting wheel 16 with the desired shearing side wall 27*b*, 37*b*.

Accordingly, there is shown here, to accomplish that, a first automatic alignment and normal force system 40 in the embodiment 20 of FIG. 1, and a slightly different second automatic alignment and normal force system 50 embodiment 30 in FIG. 2. In the system 40 of FIG. 1 an integral ring magnet 42 forms part of the hub 27, with the same diameter, including the vertical shearing surface 27*b* of the recess 27*a* desired to engage the cutting side 16*a* of the cutting wheel 16. With a magnetically attractable steel cutting wheel 16, and since the hub block 28 is freely laterally repositionable, the magnet 42 mounted thereon can pull and hold itself into engagement the cutting wheel 16 side 16*a* therewith with a substantially constant desired, preset, magnetic normal force or tension at all times. No matter where across the entire paper path width the cutting wheel is repositioned.

The system 50 of FIG. 2 differs in that a magnet 52 in the slitter unit 33 is positioned to magnetically interact with another, facing, magnet 54 in the hub block 38. That also magnetically links those two separate units together, but here by a magnetic field extending through the paper path 12. Here, the poles of the two magnets 52 and 54 are common, for magnetic repulsion. This magnetic repulsion force here has an angular component which thus pushes, with a desired, preset, constant normal force, the vertical shearing surface 37*b* of the hub 37 against the cutting wheel 16 side 16*a*, by movement of the hub block 38, irrespective of the lateral position set by the repositioning of slitter unit 33.

While the embodiments disclosed herein are preferred, it will be appreciated from this teaching that various alternatives, modifications, variations or improvements therein may be made by those skilled in the art, which are intended to be encompassed by the following claims. What is claimed is:

1. In a sheet shearing system for shearing sheets in a generally planar portion of a paper path in a selected lateral shearing position, laterally of said paper path, before said sheets are outputted by a reproduction system, which sheet shearing system includes a lateral adjustment system for selectably changing said lateral shearing position of the sheets to be sheared, laterally of said paper path, and which sheet shearing system comprises a first sheet shearing member mounted for movement laterally of said paper path on a first side of said paper path and a second sheet shearing member mounted for movement laterally of said paper path on the second, opposite, side of said paper path, and wherein said first and second shearing members are operatively aligned and operatively mating through said paper path for said sheet shearing; the improvement in said sheet shearing system comprising:

an automatic alignment and normal force system for maintaining said operative alignment and operative mating of said first and second shearing members in coordination with said lateral adjustment system for changing said lateral shearing position of the sheets to be sheared, wherein said automatic alignment and normal force system includes a magnetic force system for maintaining a constant lateral shearing normal force between said first and second shearing members with no mechanical connection therebetween through said paper path irrespective of said lateral movement of said second shearing member.

2. The sheet shearing system of claim 1 wherein said first shearing member is a sheet cutting blade member mounted on a linearly transversely moveable cutting unit transport, and said second shearing member is a rotatable hub member with at least one vertical side wall shearing surface mounted on a linearly transversely moveable hub transport.

3. The sheet shearing system of claim 2 wherein said magnetic force system comprises a magnet providing a magnetic field attracting said sheet cutting blade member against said vertical side wall shearing surface.

4. The sheet shearing system of claim 3 wherein said magnetic force system comprises a ring magnet forming said vertical side wall shearing surface and providing a magnetic field attracting said sheet cutting blade member against said vertical side wall shearing surface.

5. The sheet shearing system of claim 1 wherein said magnetic force system comprises opposing magnets on said first and second shearing members providing a transverse directional force therebetween.

6. The sheet shearing system of claim 1 wherein said magnetic force system comprises opposing field magnets respectively mounted on said first and second shearing members on opposite sides of said paper path, magnetically acting through said paper path to providing a transverse directional force therebetween pushing said first and second shearing members into sheet shearing engagement.

7. The sheet shearing system of claim 2 wherein said magnetic force system comprises opposing field magnets respectively mounted on said first and second shearing members on opposite sides of said paper path, magnetically acting through said paper path to providing a transverse directional force therebetween pushing said sheet cutting blade member against said vertical side wall shearing surface.

* * * * *